(12) United States Patent
Seifert et al.

(10) Patent No.: US 8,537,462 B2
(45) Date of Patent: Sep. 17, 2013

(54) MICROSCOPE STAGE

(75) Inventors: Roland Seifert, Heidelberg (DE); Jonas Fölling, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 120 days.

(21) Appl. No.: 13/313,176

(22) Filed: Dec. 7, 2011

(65) Prior Publication Data

US 2012/0147461 A1 Jun. 14, 2012

(30) Foreign Application Priority Data

Dec. 10, 2010 (DE) .......................... 10 2010 061 167

(51) Int. Cl.
*G02B 21/26* (2006.01)

(52) U.S. Cl.
USPC .......................................................... 359/393

(58) Field of Classification Search
USPC .................................................. 359/391–393
See application file for complete search history.

(56) References Cited

U.S. PATENT DOCUMENTS

| | | | | |
|---|---|---|---|---|
| 1,891,052 | A * | 12/1932 | Ott | 108/93 |
| 2,148,908 | A * | 2/1939 | Lory | 359/393 |
| 2,279,412 | A * | 4/1942 | Posada | 359/393 |
| 2,474,163 | A * | 6/1949 | Riley | 359/393 |
| 3,563,186 | A * | 2/1971 | Piper et al. | 108/143 |
| 3,572,888 | A * | 3/1971 | Kawashima | 359/393 |
| 3,848,963 | A * | 11/1974 | Peck | 359/391 |
| 4,012,111 | A * | 3/1977 | Masterson | 359/391 |
| 4,012,112 | A * | 3/1977 | Masterson | 359/393 |
| 4,676,492 | A | 6/1987 | Shamir | |
| 5,000,554 | A | 3/1991 | Gibbs | |
| 5,165,297 | A * | 11/1992 | Krueger | 74/479.01 |
| 5,497,060 | A * | 3/1996 | Juergens, III | 700/60 |
| 5,523,941 | A | 6/1996 | Burton et al. | |
| 5,587,833 | A * | 12/1996 | Kamentsky | 359/393 |
| 5,691,841 | A * | 11/1997 | Ohsaki et al. | 359/391 |
| 5,744,924 | A | 4/1998 | Lee | |

(Continued)

FOREIGN PATENT DOCUMENTS

| | | |
|---|---|---|
| DE | 19 38 771 A | 1/1972 |
| DE | 35 14 431 A1 | 1/1986 |
| DE | 69530095 T2 | 10/2003 |
| DE | 10 2006 021 317 B3 | 10/2007 |
| DE | 10 2008 024 568 A1 | 12/2009 |
| JP | 58-106514 A | 6/1983 |
| JP | 05040229 A * | 2/1993 |
| JP | 2005-091866 A | 4/2005 |
| WO | 2006/127692 A2 | 11/2006 |
| WO | 2007/128434 A1 | 11/2007 |

OTHER PUBLICATIONS

Rust, M. J. et al., "Sub-diffraction-limit imaging by stochastic optical reconstruction microscopy (STORM)", Nature Methods, Oct. 2006, vol. 3, No. 10, pp. 793-795.

Geisler, C. et al., "Resolution of λ/10 in fluorescence microscopy using fast single molecule photo-switching", Applied Physics A, Jun. 1, 2007, vol. 88, pp. 223-226.

*Primary Examiner* — Mark Consilvio
(74) *Attorney, Agent, or Firm* — Hodgson Russ LLP

(57) ABSTRACT

A microscope stage (14) comprising a platform (16), a specimen holder (18) resting on the platform (16) and a positioning device (20) for moving the specimen holder (18) in a plane of displacement parallel to the platform (16) is described. The microscope stage (14) includes a positioning device (20) having two displacing devices (34, 36) which are mechanically decoupled from each other and of which a first displacing device (34) is designed to move the specimen holder (18) along a first axis in the plane of displacement, and a second displacing device (36) is designed to move the specimen holder (18) along a second axis in the plane of displacement, which second axis runs transversely to the first axis.

15 Claims, 6 Drawing Sheets

(56) References Cited

U.S. PATENT DOCUMENTS

| | | |
|---|---|---|
| 6,369,940 B1 | 4/2002 | Nishida et al. |
| 6,563,635 B2 * | 5/2003 | Nishida et al. ............... 359/393 |
| 6,907,798 B2 * | 6/2005 | Ganser et al. ............. 73/864.41 |
| 6,920,803 B2 * | 7/2005 | Hasegawa .................. 74/89.22 |
| 7,136,708 B2 * | 11/2006 | Yamaguchi ..................... 700/64 |
| 7,342,718 B2 * | 3/2008 | Takeuchi ..................... 359/393 |
| 7,830,598 B2 * | 11/2010 | Tsuchiya ..................... 359/395 |
| 8,446,669 B2 * | 5/2013 | Seifert ......................... 359/392 |
| 2006/0138871 A1 | 6/2006 | Rakhovsky |
| 2009/0134342 A1 | 5/2009 | Hell et al. |
| 2009/0135477 A1 * | 5/2009 | Noda ............................ 359/391 |
| 2012/0147462 A1 * | 6/2012 | Seifert ......................... 359/392 |

\* cited by examiner

MICROSCOPE STAGE

CROSS REFERENCE TO RELATED APPLICATIONS

This application claims priority of German patent application number 10 2010 061 167.0 filed Dec. 10, 2010, the entire disclosure of which is incorporated by reference herein.

FIELD OF THE INVENTION

The present invention relates generally to a microscope stage.

BACKGROUND OF THE INVENTION

In the recent past, light microscopic methods have been developed with which, based on a sequential, stochastic localization of individual point objects, in particular fluorescence molecules, image structures can be imaged that are smaller than the diffraction-dependent resolution limit of conventional light microscopes. Such methods are, for example, described in WO 2006/127692 A2; DE 10 2006 021 317 B3; WO 2007/128434 A1, US 2009/0134342 A1; DE 10 2008 024 568 A1; "Sub-diffraction-limit imaging by stochastic optical reconstruction microscopy (STORM)", Nature Methods 3, 793-796 (2006), M. J. Rust, M. Bates, X. Zhuang; "Resolution of Lambda/10 in fluorescence microscopy using fast single molecule photo-switching", Geisler C. et al, Appl. Phys. A, 88, 223-226 (2007). This new branch of microscopy is also referred to as localization microscopy. The applied methods are known in the literature, for example, under the designations (F)PALM ((Fluorescence) Photoactivation Localization Microscopy), PALMIRA (PALM with Independently Running Acquisition), GSD(IM) (Ground State Depletion (Individual Molecule return) Microscopy) or (F)STORM ((Fluorescence) Stochastic Optical Reconstruction Microscopy).

The new methods have in common that the structures to be imaged are prepared with markers that have two distinguishable states, namely a "bright" state and a "dark" state. When, for example, fluorescent dyes are used as markers, then the bright state is a state in which they are able to fluoresce and the dark state is a state in which they are not able to fluoresce. For imaging image structures with a resolution that is higher than the conventional resolution limit of the imaging optical system, a small subset of the markers is repeatedly brought into the bright state and thus it is so to speak activated. In this connection, the activated subset is to be chosen such that the average distance of adjacent markers in the bright state is greater than the resolution limit of the imaging optical system. The luminance signals of the activated subset are imaged onto a spatially resolving light detector, e.g. a CCD camera. Thus, of each marker a light spot is detected whose size is determined by the resolution limit of the imaging optical system.

In this way, a plurality of raw data single frames is captured, in each of which a different activated subset is imaged. Using an image analysis process, then in each raw data single frame the centroids of the light spots are determined which represent those markers that are in the bright state. Thereafter, the centroids of the light spots determined from the raw data single frames are combined to a total representation. The high-resolution image created from this total representation reflects the distribution of the markers. For a representative reproduction of the structure to be imaged sufficient signals have to be detected. Since however the number of markers in the respective activated subset is limited by the minimum average distance which two markers may have in the bright state, a great many raw data single frames have to be captured to completely image the structure. Typically, the number of raw data single frames is in a range between 10,000 and 100,000.

The time required for capturing one raw data single frame has a lower limit that is predetermined by the maximum image capturing rate of the imaging detector. This results in relatively long total capturing times for a series of raw data single frames required for the total representation. Thus, the total capturing time can take up to several hours.

Over this long total capturing time, a movement of the specimen to be imaged relative to the imaging optical system may occur. Since for creating a high-resolution total image all raw data single frames are combined after the determination of the centroids, each relative movement between specimen and imaging optical system that occurs during the capturing of two successive raw data singles frames impairs the spatial resolution of the total image. In many cases, this relative movement results from a systematic mechanical movement of the system, also referred to as mechanical drift which is caused, for example, by thermal expansion or shrinkage, by mechanical strains or by the change in the consistency of lubricants used in the mechanical components.

In the above-described high-resolution methods it is of particular importance to provide for a drift-free positioning of the specimen on a microscope stage. In the prior art, often so-called mechanical stages (X-Y stages) are used for this purposes, which allow to move a specimen holder on a platform in two orthogonal directions (in the following also referred to as X and Y direction) in a plane of displacement (X-Y-plane) that is parallel to the platform. Such a mechanical stage consists of two superposed plates which are mechanically coupled to each other as well as a drive for moving the two plates against each other. Thus, in the case of a mechanical stage the movements of the specimen holder in the direction of the X-axis and the Y-axis are coupled to each other.

By means of such a microscope stage it is basically possible to position the specimen holder on the microscope stage in an easy and precise manner. However, due to the mechanical coupling of the components forming the mechanical stage a mechanical drift occurring in one of these components as a result of thermal influences or mechanical strains existing in the drive also has an effect on the respective other components. In high-resolution light microscopic methods in which long total capturing times are intended and resolutions in the nanometer range are aimed at, this may result in intolerable image shifts.

From DE 695 30 095 T2, a planar positioning stage is known having a platform upon which a workpiece to be positioned is placed. The positioning stage further comprises a first and a second actuator means which are adapted to move the workpiece in an actuating plane along a first axis or along a second axis that runs transversely to the first axis.

In DE 35 14 431 A1 a microscope stage drive is described which comprises two carriages which are movable orthogonally to each other, and coaxially mounted drive members for moving the carriages. The force transmission between the drive members and the carriages takes place via traction means running over deflection rollers.

From DE 19 38 771 A, a precision drive for two carriages is known which can be guided and displaced orthogonally to each other, of which a first carriage is mounted in a stationary guide and a second carriage is mounted in a guide provided on the first carriage.

With respect to the prior art, reference is further made to JP 2005 091 866 A, U.S. Pat. No. 5,000,554 A, JP 58-106 514 A and US 2006/0 138 871 A1, from which positioning devices are known with which an object can be moved in a plane of displacement along two axes which are orthogonal to each other.

SUMMARY OF THE INVENTION

It is the object of the invention to specify a microscope stage to be used in high-resolution light microscopy, which microscope stage enables a precise and drift-free positioning of a specimen holder on the microscope stage relative to the imaging optical system.

Accordingly, the invention provides a complete decoupling of the movements of the specimen holder along the first axis and the second axis. As a result thereof, mutual drift influences of the two displacing devices forming the positioning device are reliably prevented. Thus, it is impossible that a mechanical drift occurring in one of the two displacing devices is transmitted to the other displacing device and thus causes an incorrect positioning of the specimen holder.

Preferably, the specimen holder rests on the platform with an adhesive force that is greater than a force with which the positioning device acts in its deactivated operating state on the specimen holder. "Deactivated" operating state is understood to mean a state in which the positioning of the specimen holder on the platform is completed and the positioning device is so to speak inoperable. The sufficiently high adhesive force with which the specimen holder rests on the platform can be achieved by a correspondingly high weight of the specimen holder. This weight is to be chosen such that, on the one hand, it still allows for a precise displacement of the specimen holder on the platform by means of the positioning device and, on the other hand, it guarantees that the specimen holder after having been moved into its target position rests on the platform so firmly that an unintentional action of the positioning device caused by a drift does not result in any displacement of the specimen holder on the platform.

A sufficiently high adhesive force can also be achieved or at least achieved in part by different material properties. For example, it is conceivable to provide for a magnetic interaction between the specimen holder and the platform by which the adhesive force becomes so high that a displacement of the specimen holder by means of the deactivated positioning device is impossible. For example, it is also conceivable to change the surface of the specimen holder and/or of the positioning device to achieve an increase in the adhesive force so that a displacement of the specimen holder by means of the deactivated positioning device is made impossible.

An advantageous embodiment of the microscope stage provides that the first displacing device comprises a first slider which for displacing the specimen holder can be brought into contact therewith, a first linear guide in which the first slider is guided along the first axis, and a first drive for moving the first slider along the first axis, and in that the second displacing device comprises a second slider which for displacing the specimen holder can be brought into contact therewith, a second linear guide in which the second slider is guided along the second axis, and a second drive for moving the second slider along the second axis. In this embodiment, the mechanical decoupling of the two displacing devices is realized by providing separate sliders, linear guides and drives, which ensure that the specimen holder can be displaced in independent movements along the first and the second axis. The adhesive force with which the specimen holder rests on the platform is greater than the sum of those forces with which the drives via their associated sliders act on the specimen holder in the deactivated operating state of the positioning device. For this, the drives are preferably designed so smooth that the sliders which are coupled to the drives are so to speak pushed off from the specimen holder when they are pressed against the specimen holder as a result of mechanical drift. In particular, it is ensured that the specimen holder has neither a non-positive nor a positive connection to the drives.

In a further advantageous embodiment, the first slider has a substantially U-shaped form and has a first base portion arranged along the first axis as well as two first leg portions arranged transversely to the first axis. Accordingly, the second slider has a substantially U-shaped form and has a second base portion arranged along the second axis as well as two second leg portions arranged transversely to the second axis. Further, the specimen holder is substantially designed as a rectangular plate which has two first opposite sides which are flanked with clearance by the first leg portions of the first plate, and two second opposite sides which are flanked with clearance by the second leg portions of the second plate. In this embodiment, the specimen holder is arranged each time between the two leg portions of the two U-shaped sliders. In order to minimize the force with which the positioning device acts in its deactivated operating state on the specimen holder, the distance between the two leg portions of the respective slider is so large that the specimen holder is not clamped between the two leg portions. This ensures that in the deactivated operating state of the positioning device at most one of the two leg portions rests against the specimen holder and is so to speak pushed off therefrom when it is pressed against the specimen holder as a result of mechanical drift.

Preferably, the two sliders are arranged to each other in a crosswise and contact-free manner. For this, one of the two second leg portions of the second slider can have an elongated recess which extends parallel to the first axis, whereas one of the two first leg portions of the first slider passes through the recess parallel to the second axis. Taking into account the paths of displacement of the two sliders, the length of this recess is to be dimensioned such that the sliders are arranged in a contact-free manner over their entire range of movement and are thus decoupled from each other.

Preferably, the two drives each comprise a rope which is driven so as to run around rollers and a coupling element which is fitted to the rope and by which the respective rope is firmly coupled to the associated slider. This embodiment serves to develop the drives particularly smoothly. This ensures that the forces which arise in the respective drive for example due to thermal deformation relax within the drive without displacing the specimen holder resting on the platform with a relatively high adhesive force when the positioning device is deactivated.

Preferably, the coupling element is a rope tensioner in which the two ends of the rope are clamped. In this way, the rope tension which has an influence on the smoothness of the respective rope drive can be optimized easily.

In a further embodiment, the two drives each comprise a manually operated drive wheel and a reduction gear set which is coupled to the drive wheel and the rope and converts the rotary motion of the respective drive wheel into the circulating drive motion of the associated rope. By means of this embodiment, the user is able to position the specimen holder easily on the platform. The reduction gear set increases the precision with which this positioning can take place.

In an advantageous development, the two linear guides each comprise a guide rail arranged along the associated axis and at least one linear bearing which is coupled to the associated slider and is displaceable on the respective guide rail. For example, linear ball bearings or linear slide bearings, which can be designed particularly smoothly, can be used as linear bearings.

Preferably, a sufficiently high adhesive force with which the specimen holder rests on the platform is achieved by a correspondingly high weight of the specimen holder. For example, the specimen holder can be made of brass, whereas the two sliders are made of aluminum. This material selection ensures that the specimen holder has a relatively high weight compared to the two sliders and thus a relatively high adhesive force on the platform.

In a particularly preferred embodiment, an objective is mounted to the platform. Compared to conventional embodiments in which the objective is decoupled from the platform, this development has the advantage that not only the specimen holder but also the objective has a fixed arrangement relative to the platform, as a result whereof the mechanical drift between the specimen holder and the objective is minimized.

The mechanical drift can be reduced further when the objective is mounted to the platform via a focusing drive. By mounting the focusing drive to the platform in a fixed spatial arrangement relative to the specimen holder resting on the platform, also the focusing of the objective which is required in any case is not prone to drift.

According to a further aspect of the invention, a microscope having a microscope stage of the above-explained type is provided.

Preferably, such a microscope comprises an objective revolver for the selective rotation of one of several microscope objectives held on the objective revolver into the beam path. If, in addition to this objective revolver, an objective mounted to the platform is provided, then such a microscope can be used particularly flexibly. For example, it is possible to observe, at first for an overview, a relatively large image section by means of one of the microscope objectives held on the objective revolver and to select a suitable target area within this image section which is then imaged with a particularly high resolution by means of the objective that is held on the platform in a largely drift-free manner. In this case, the objective held on the platform is to be mounted such that it can be removed from the imaging beam path via a suitable swivel device and, if necessary, can again be swiveled into the beam path and can then be fixed on the platform in a position-stable manner.

BRIEF DESCRIPTION OF THE DRAWINGS

Exemplary embodiments of the present invention are described in more detail below with reference to the schematic drawings, in which.

DETAILED DESCRIPTION OF THE INVENTION

Figure 1:
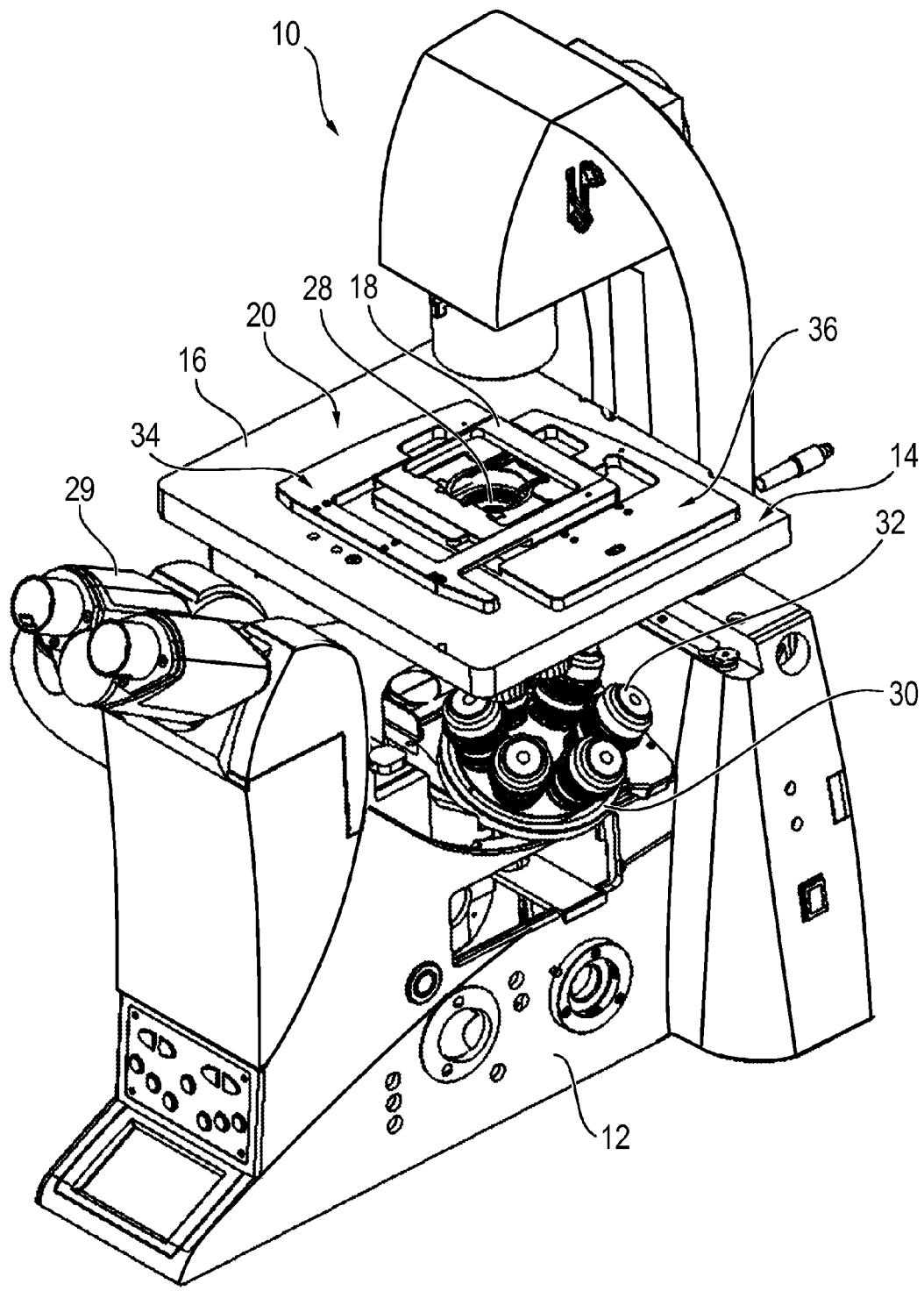
FIG. 1 shows a perspective view of a high-resolution light microscope as an embodiment.

In the following, at first the total structure of a high-resolution light microscope 10 is explained with reference to FIGS. 1 and 2. Here, only those components of the light microscope 10 are described which are required for understanding the present invention.

The light microscope 10 has a microscope stand 12 on which a microscope stage 14 is screwed. The microscope stage 14 has a platform 16 on which a specimen holder 18 rests. On the platform 16, there is further a positioning device 20 which will be described in more detail later on and which serves to position the specimen holder 18 on the platform 16.

Figure 2:
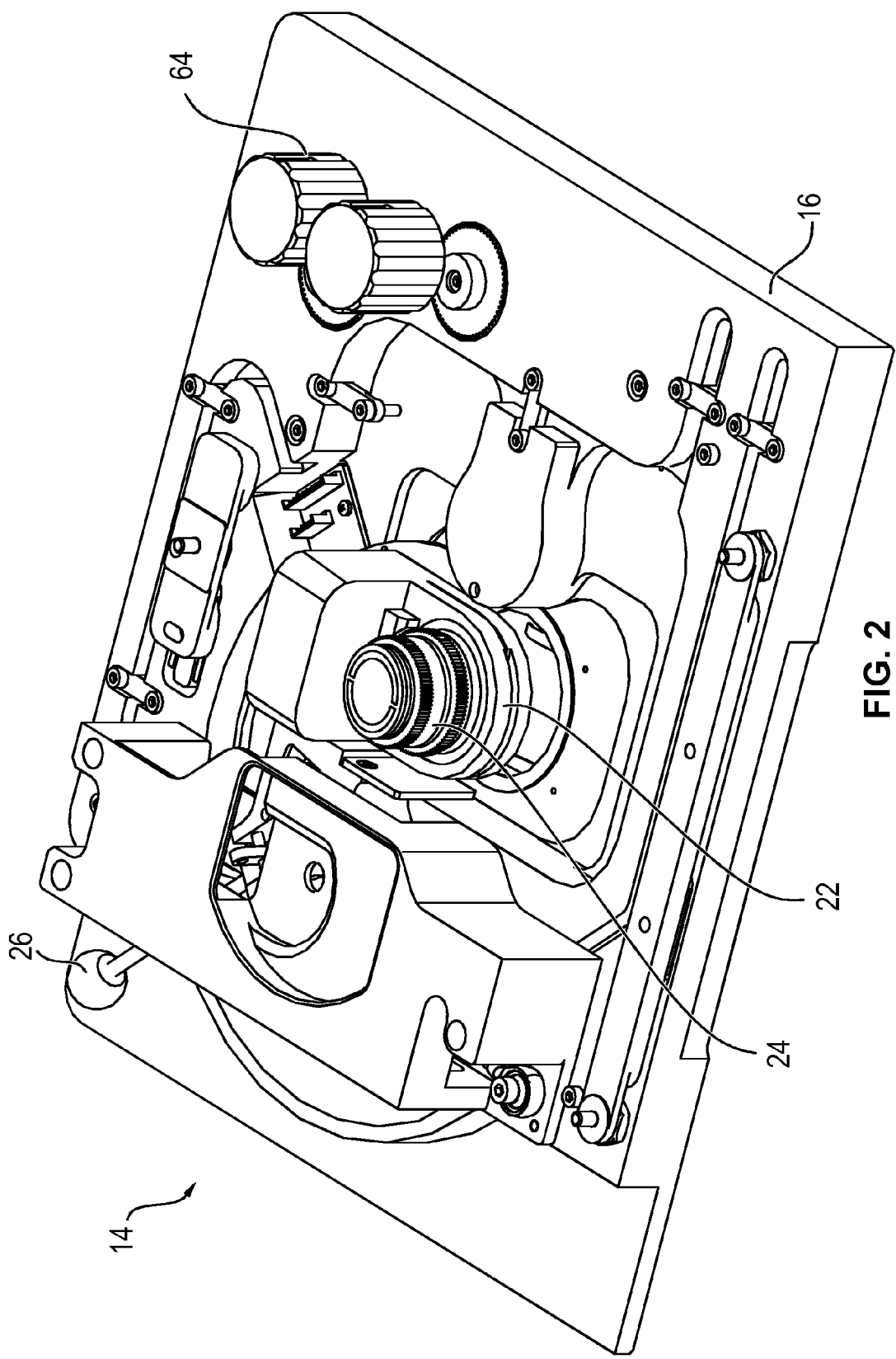
FIG. 2 shows a perspective bottom view of the microscope stage of the light microscope according to FIG. 1.

As shown in the bottom view of FIG. 2, a pivotable focusing drive 22 into which an objective 24 is screwed is mounted to the underside of the platform 16. By means of a pivoted lever 26, the focusing drive 22 together with the objective 24 held thereon can be swiveled out and into an imaging beam path of the light microscope 10. The imaging beam path passes through a through hole 28 which is formed in the platform 16 and above which the specimen holder 18 is arranged.

The light microscope 10 further has a pair of eyepieces 29 mounted to the microscope stand 12 as well as an objective revolver 30 holding several microscope objectives 32. In the illustration of FIG. 1, the microscope stand 12 is illustrated with the microscope stage 14 being lifted so that the objective revolver 30 which is otherwise covered by the microscope stage 14 is visible.

Thus, besides the microscope objectives 32 held on the objective revolver 30, the light microscope 10 in addition comprises the objective 24 mounted to the platform 16. The objective revolver 30 can be used to observe, at first for an overview, a relatively large image field in that one of the microscope objectives 32 is selectively rotated into the imaging beam path. For this, the objective 24 mounted to the platform 16 is swiveled out of the imaging beam path by means of the pivoted lever 26. If a certain target area within the observed image field is to be imaged thereafter with a particularly high resolution, then the microscope objective 32 that is currently arranged in the imaging beam path is removed from the imaging beam path and the objective 24 mounted to the platform 16 is swiveled into the imaging beam path. As the objective 24 is arranged directly on the platform 16, the mechanical drift between the specimen holder 18, on which the non-illustrated specimen is held, and the objective 24 is relatively low (at least lower than when using one of the objectives 32 held on the objective revolver 30) so that in this configuration a high-resolution imaging of the specimen according to one of the methods of localization microscopy described at the beginning is possible.

In the following, the positioning device 20 is explained in more detail with reference to FIGS. 3 to 6.

The positioning device 20 comprises two displacing devices 34 and 36 which are mechanically decoupled from each other. The displacing device 34 serves to displace the specimen holder 18 in a first direction on the platform 16, whereas the second displacing device is used to displace the specimen holder 18 in a second direction on the platform 16, which second direction is orthogonal to the first direction. The two afore-mentioned directions are indicated by the double arrows X and Y, respectively, in FIGS. 3 to 6. Accordingly, the first displacing device 34 is referred to in the following as X displacing device and the second displacing device is referred to as Y displacing device. The plane of displacement spanned by the two directions X and Y is referred to in the following as X-Y-plane.

Figure 3:
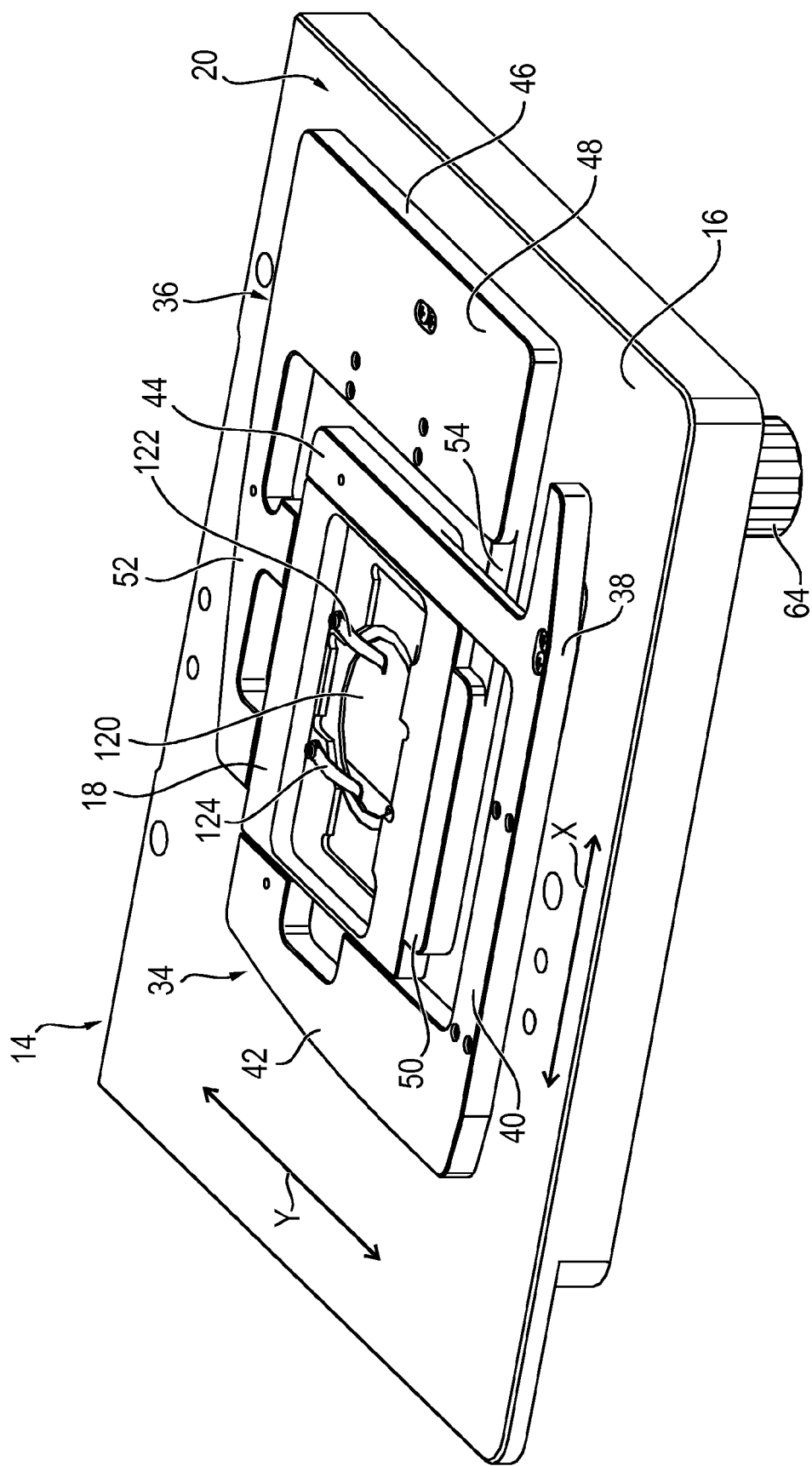
FIG. 3 shows a perspective top view of the microscope stage.
Figure 4:
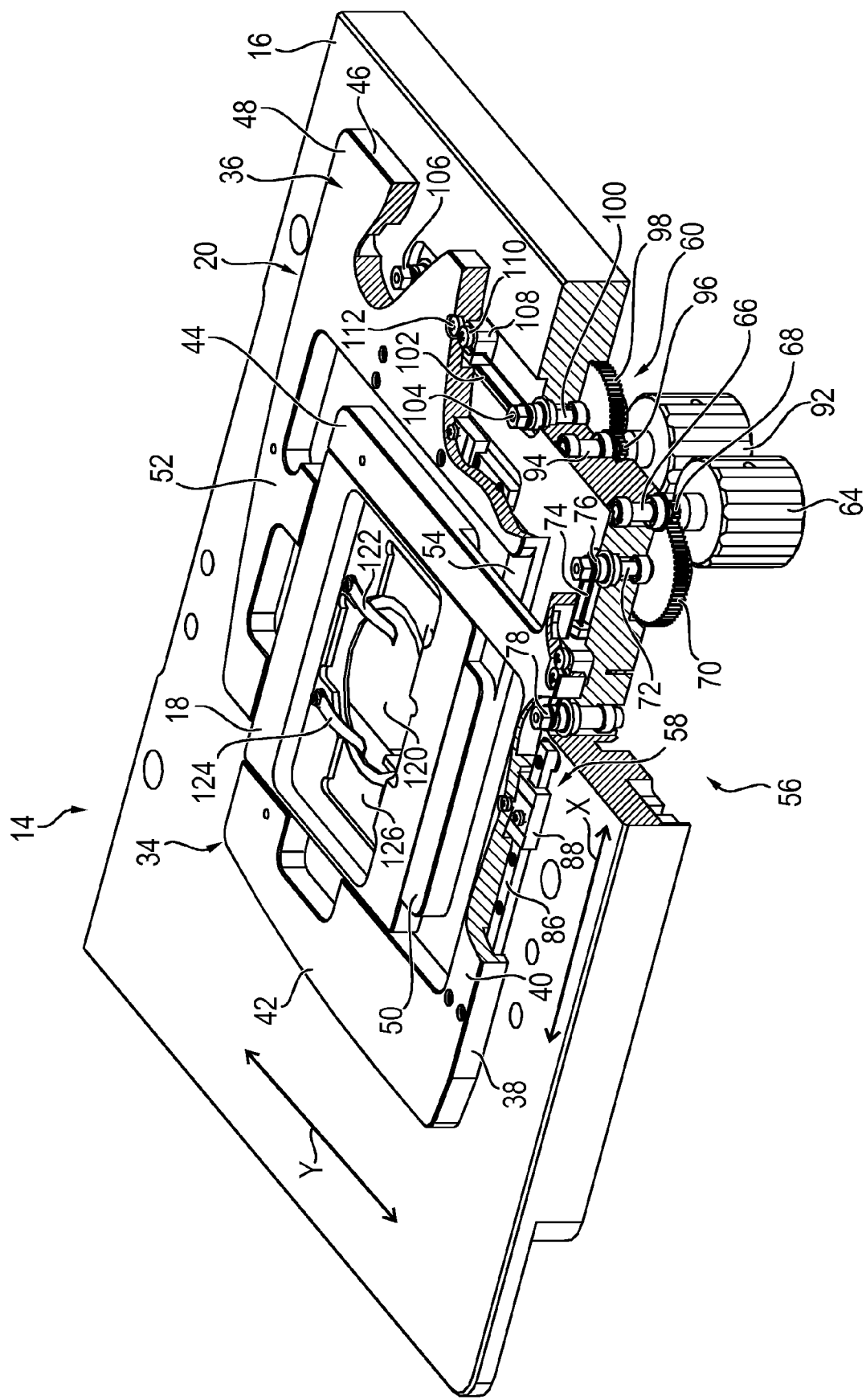
FIG. 4 shows a perspective, partially sectional top view of the microscope stage, with an X drive and an Y drive being emphasized.
Figure 5:
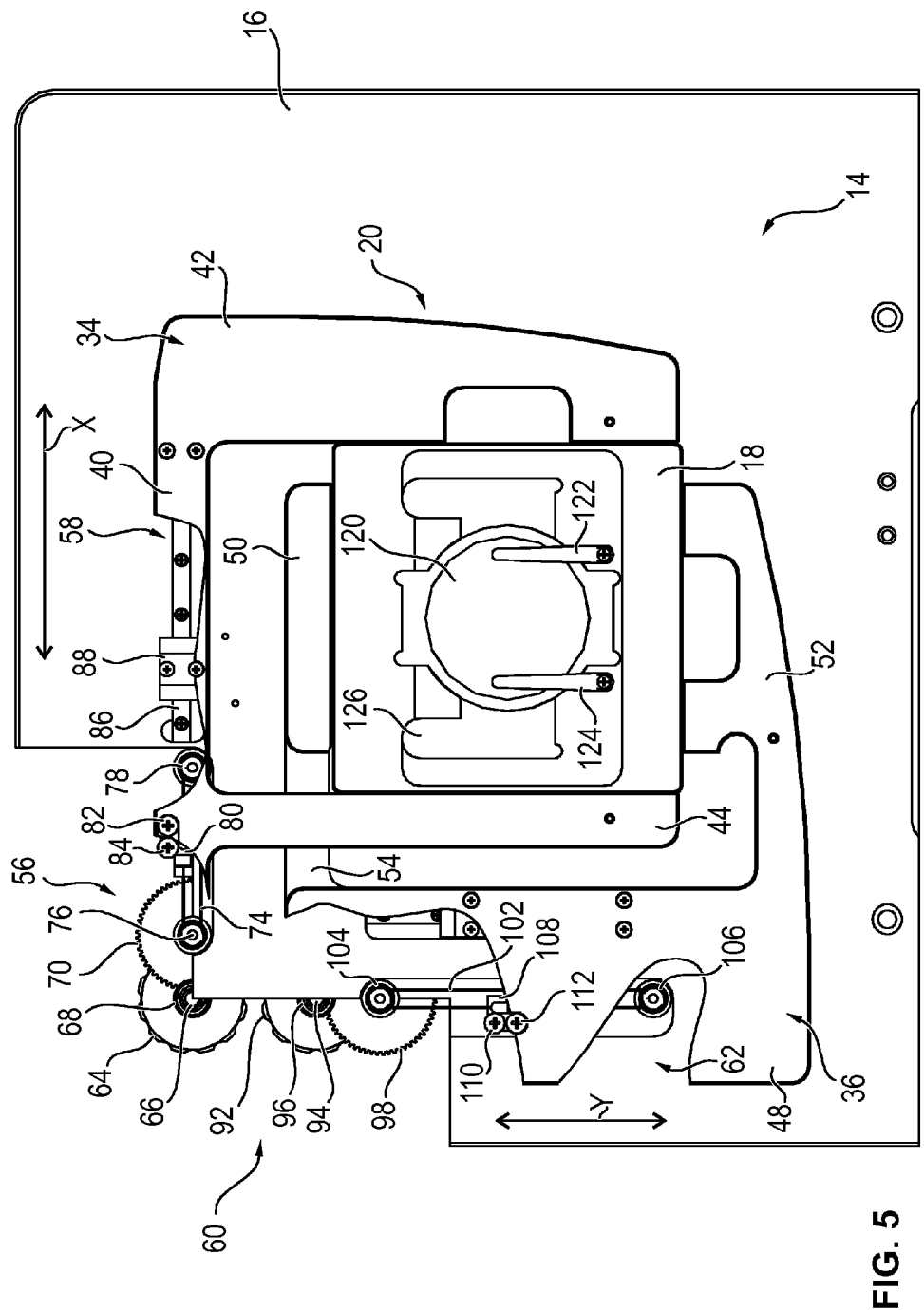
FIG. 5 shows a top view of the microscope stage, in which a part of the microscope stage is omitted for emphasizing the X-drive and the Y-drive.

As can be taken from FIG. 3, the X displacing device 34 comprises an X slider 38 which is movable back and forth in X direction. The X slider 38 is formed as a substantially U-shaped plate having a base portion 40 and two parallel leg portions 42 and 44. The base portion 40 extends in X direction, whereas the two leg portions 42, 44 extend in Y direction. Accordingly, the Y displacing device 36 comprises an Y slider 46 which is movable back and forth in Y direction. The Y slider 46 likewise has a base portion 48 and two parallel leg portions 50 and 52. The base portion 48 extends in Y direction, whereas the two leg portions 50, 52 extend in X direction.

The X slider 38 and the Y slider 46 are arranged to each other such that their leg portions 42, 44 and 50, 52, respectively, are so to speak interlaced without contacting each other within their ranges of displacement. For this, the leg portion 50 of the Y slider 46 has an elongated recess 54 which extends in X direction and is passed through by the leg portion 44 of the X slider 38 in Y direction. The recess 54 thus guarantees the interlaced, contact-free arrangement of the two sliders 38 and 46 relative to each other.

Figure 6:
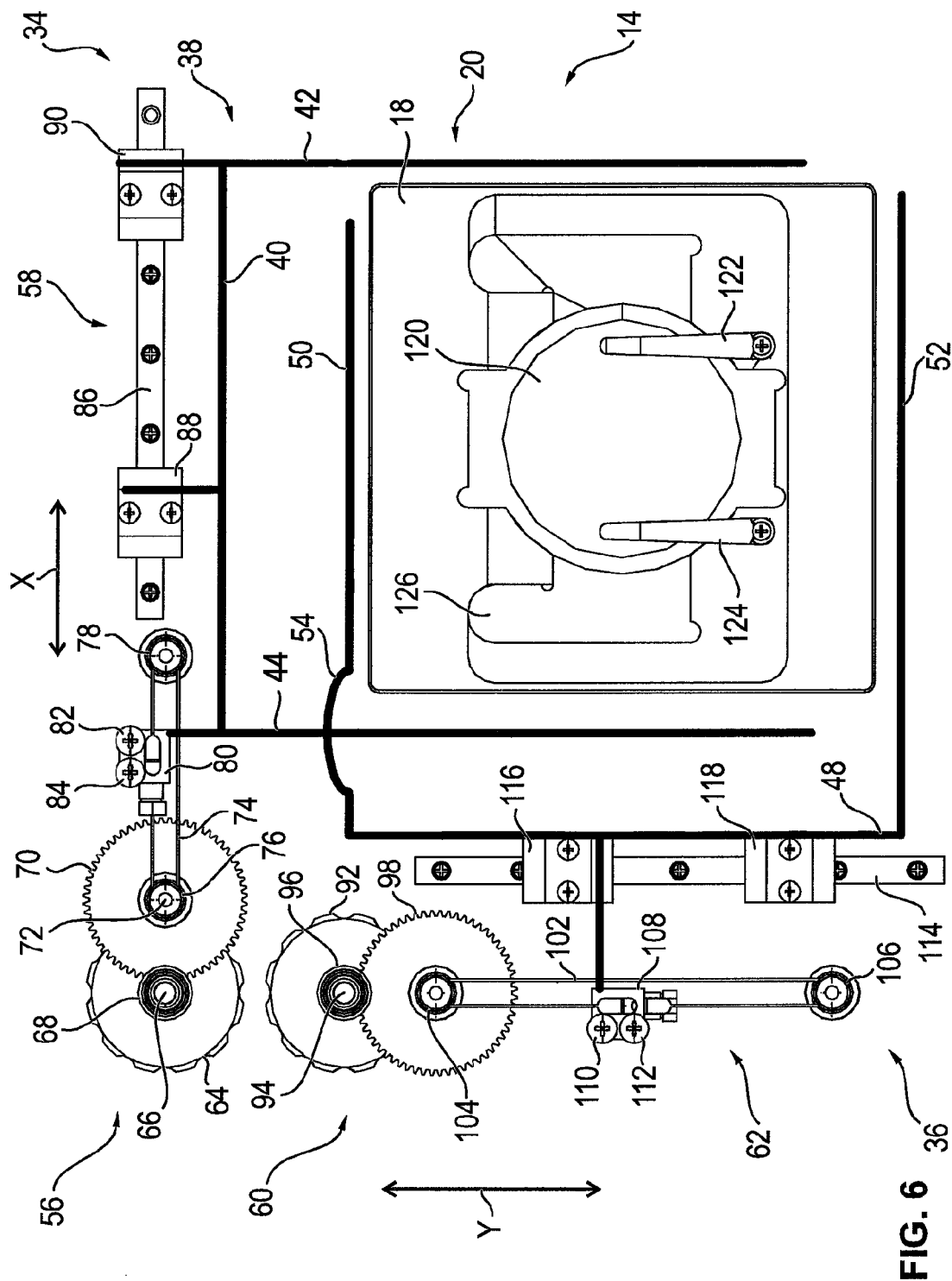
FIG. 6 shows a top view of the microscope stage in which an X slider and an Y slider are merely schematically illustrated.

The X displacing device 34 further comprises an X drive 56 and an X linear guide 58. The X drive 56 and the X linear guide 58 serve to move the X slider 38 in X direction in a linearly guided manner. Accordingly, the Y actuating device 36 comprises an Y drive 60 and an Y linear guide 62 which serve to move the Y slider 46 in the direction of the Y axis in a linearly guided manner. The drives 56, 60 and the linear guides 58, 62 are explained in more detail in the following with reference to FIGS. 4 to 6. In this connection, FIG. 6 shows the two sliders 38 and 46 in an abstract manner with respect to their form to illustrate the functioning of the inventive arrangement.

The X drive 56 has an X handwheel 64 which is rotatably mounted to the platform 16 via a bearing 66. To the X handwheel 64, a gearwheel 68 is coupled which rotates together with the handwheel 64. The gearwheel 68 is engaged with a gearwheel 70 which is rotatably mounted to the platform 16 via a bearing 72. The gearwheels 68 and 70 are dimensioned such that together they form a reduction gear set.

The rotary motion of the gearwheel 70 is transmitted to an X drive rope 74. The X drive rope 74 is guided over a drive roller 76 coupled to the gearwheel 70 as well as a deflection roller 78 mounted in the platform 16. The two ends of the X drive rope 74 are fixed in a rope tensioner 80 by means of fixing screws 82 and 84. By means of the rope tensioner 80, the rope tension of the X drive rope 74 can be adjusted as desired.

The rope tensioner 80 is firmly mounted to the X slider 38. The rope tensioner 80 thus forms a driving element which converts the circulating motion of the X drive rope 74 caused by the actuation of the X handwheel 84 into a motion of the X slider 38.

The X linear guide 58 has an X guide rail 86 extending in X direction and firmly mounted in the platform 16. The X guide rail 86 forms an axis along which the X slider 38 is guided. For this, two linear bearings 88 and 90 are movably arranged on the X guide rail 86. The two linear bearings 88 and 90 are firmly coupled to the X slider 38. They move on the X guide rail 86 when the X slider 38 is moved in X direction by the X drive 56.

The Y drive 60 and the Y linear guide 62 are formed in accordance with the X drive 56 and the X linear guide 58, respectively. Accordingly, the Y drive 60 comprises an Y handwheel 92, a bearing 94, gearwheels 96 and 98, a bearing 100, an Y drive rope 102, a drive roller 104, a deflection roller 106, a rope tensioner 108 as well as fixing screws 110, 112, whereas the Y linear guide 62 has an Y guide rail 114 as well as two linear bearings 116, 118. The components 92 to 118 of the Y displacing device 36 operate in the same manner as the components 64 to 90 of the X displacing device 34 (apart from the fact that the components 92 to 118 serve to displace the specimen holder in Y direction).

As can be best seen in FIGS. 3 to 6, the specimen holder 18 is substantially formed as a rectangular plate which, in its center, has a circular opening 120 which is aligned with the through hole 28 of the platform 16. The specimen holder 18 further comprises clamps 122 and 124 which serve to fix the specimen to be observed and not illustrated in the Figures in a female recess 126 of the specimen holder 18.

As already mentioned above, the X displacing device 34 and the Y displacing device 36 serve to move the specimen holder 18 on the platform 16 independently in X direction and in Y direction. The functioning of the two displacing devices 34 and 36 is described in detail in the following with reference to FIG. 6.

As illustrated in the view according to FIG. 6, the two leg portions 42 and 44 of the X slider 38 are arranged such that they flank two opposite sides of the specimen holder 18 with clearance. This means that the distance between the two leg portions 42 and 44 measured in X direction is greater than the dimension of the specimen holder 18 in X direction. Thus, it is guaranteed that the specimen holder 18 is never simultaneously contacted by both leg portions 42 and 44 and is thus not clamped therebetween. In FIG. 6, the clearance which the leg portions 42, 44 have relative to the specimen holder 18 is illustrated exaggeratedly large for a better understanding. In practice, it only has to be so large that a clamping of the specimen holder between the two leg portions 42, 44 is avoided.

If the specimen holder 18 is to be moved in X direction, then the X handwheel 64 is rotated, whereupon its rotary motion is converted into a circulating motion of the X drive rope 74 via the reduction gear set formed by the gearwheels 68 and 70. This circulating motion of the X drive rope 74 is in turn transmitted to the X slider 38 via the X rope tensioner 80. Here, one of the two leg portions 42 and 44 comes into contact with the side of the specimen holder 18 facing the respective leg portion. This causes that the specimen holder 18 is displaced on the platform 16 in X direction.

Accordingly, the specimen holder (independent of the movement in X direction) is moved in Y direction via the Y drive 60 and the Y linear guide 62.

The specimen holder 18 rests on the platform 16 with an adhesive force that is greater than the sum of all forces which the positioning device 20, in its deactivated state, exerts on the specimen holder 18 as a result of mechanical drift. In particular, the afore-mentioned adhesive force is greater than the force which one of the leg portions 42, 44, 50, 52 exerts on the specimen holder 18 when it directly bears against the side of the specimen holder 18 that faces the respective leg portion.

This is achieved, on the one hand, in that the drives 56, 60 and the linear guides 58, 62 are particularly smooth and, on the other hand, in that the sliders 38 and 46 rest on the platform 16 with a significantly lower adhesive force than the specimen holder 18. The latter is, for example, achieved in that the specimen holder 18 is made of a relatively heavy material, such as brass, whereas the sliders 38 and 46 are made of a significantly lighter material, such as aluminum.

By means of these measures it is achieved that the movable parts of the drives 56, 60 and of the linear guides 58, 62 are moved opposite to the direction in which one of the leg portions 42, 44, 50, 52 presses against the specimen holder 18 when a mechanical drift occurs, i.e. they yield. The leg portion is thus so to speak pushed off from the specimen holder 18, whereas the drives 56, 60 and the linear guides 58, 62 do not offer any appreciable resistance to this push-off movement of the leg portion, but yield to this movement.

The invention is not to be limited to the specific embodiments disclosed, and modifications and other embodiments are intended to be included within the scope of the invention.

LIST OF REFERENCE NUMERALS

- 10 light microscope
- 12 microscope stand
- 14 microscope stage
- 16 platform
- 18 specimen holder
- 20 positioning device
- 22 focusing drive
- 24 objective
- 26 pivoted lever
- 28 through hole
- 29 eyepieces
- 30 objective revolver
- 32 microscope objectives
- 34 X displacing device
- 36 Y displacing device
- 38 X slider
- 40 base portion
- 42, 44 leg portions
- 46 Y slider
- 48 base portion
- 50, 52 leg portions
- 54 recess
- 56 X drive
- 58 X linear guide
- 60 Y drive
- 62 Y linear guide
- 64 X handwheel
- 66 bearing
- 68, 70 gearwheels
- 72 bearing
- 74 X drive rope
- 76 drive roller
- 78 deflection roller
- 80 rope tensioner
- 82, 84 fixing screws
- 86 X guide rail
- 88, 90 linear bearing
- 92 Y handwheel
- 94 bearing
- 96, 98 gearwheels
- 100 bearing
- 102 Y drive rope
- 104 drive roller
- 106 deflection roller
- 108 rope tensioner
- 110, 112 fixing screws
- 114 Y guide rail
- 116, 118 linear bearing
- 120 opening
- 122, 124 clamps
- 126 female recess

What is claimed is:

1. A microscope stage (14), comprising:
   a platform (16);
   a specimen holder (18) resting on the platform (16);
   a positioning device (20) for moving the specimen holder (18) in a plane of displacement that is parallel to the platform (16);
   wherein the positioning device (20) includes a first displacing device (34) and a second displacing device (36) that is mechanically decoupled from the first displacing device (34), the first displacing device (34) is configured to move the specimen holder (18) along a first axis in the plane of displacement, the second displacing device (36) is configured to move the specimen holder (18) along a second axis in the plane of displacement, the second axis being transverse to the first axis;
   wherein the first displacing device (34) includes a first slider (38) having two first leg portions (42, 44) which are arranged transversely to the first axis and can be brought into contact the specimen holder (18) for moving the specimen holder, a first linear guide (48) for guiding the first slider (38) along the first axis, and a first drive (56) for moving the first slider (38) along the first axis;
   wherein the second displacing device (36) includes a second slider (46) having two second leg portions (50, 52) which are arranged transversely to the second axis and can be brought into contact with the specimen holder (18) for moving the specimen holder, a second linear guide (62) for guiding the second slider (46) along the second axis, and a second drive (60) for moving the second slider (46) along the second axis;
   wherein one of the two second leg portions (50, 52) of the second slider (46) has an elongated recess (54) extending parallel to the first axis, and one of the two first leg portions of the first slider (38) passes through the recess parallel to the second axis.

2. The microscope stage (14) according to claim 1, wherein the specimen holder (18) rests on the platform (16) with an adhesive force that is greater than a force with which the positioning device (20) in its deactivated operating state acts on the specimen holder (18).

3. The microscope stage (14) according to claim 2, wherein the first slider (38) is substantially U-shaped and comprises a first base portion (40) between the two first leg portions (42, 44), the first base portion (40) being arranged along the first axis and the two first leg portions (42, 44) being arranged transversely to the first axis;
   wherein the second slider (46) is substantially U-shaped and comprises a second base portion (48) between the two second leg portions (50, 52), the second base portion (48) being arranged along the second axis and the two second leg portions (50, 52) being arranged transversely to the second axis; and
   wherein the specimen holder (18) is substantially formed as a rectangular plate having two first opposite sides adjacent the first leg portions (42, 44) of the first slider (38) and having two second opposite sides adjacent the second leg portions (50, 52) of the second slider (46).

4. The microscope stage (14) according to claim 3, wherein the two sliders (38, 46) are arranged in a crosswise and contact-free manner with respect to one another.

5. The microscope stage (14) according to claim 1, wherein the first drive (56) includes a first rope (74) driven around a first set of rollers (76, 78) and includes a first coupling element (80) fitted to the first rope (74), the first coupling element (80) coupling the first rope (74) to the first slider (38); and wherein the second drive (60) includes a second rope (102) driven around a second set of rollers (104, 106) and includes a second coupling element (108) fitted to the second rope (102), the second coupling element (108) coupling the second rope (102) to the second slider (46).

6. The microscope stage (14) according to claim 5, wherein the first coupling element (80) is a rope tensioner (80) in which ends of the first rope (74) are clamped and the second coupling element is a rope tensioner (108) in which ends of the second rope (102) are clamped.

7. The microscope stage (14) according to claim 5, wherein the first drive (56) comprises a first manually operable drive wheel (64) and a first reduction gear set (68, 70) which is coupled to the first manually operable drive wheel (64) and the first rope (74), the first reduction gear set (68, 70) configured to convert a rotary motion of the first manually operable drive wheel (64) into circulating drive motion of the first rope (74); and wherein the second drive (60) comprises a second manually operable drive wheel (92) and a second reduction gear set (96, 98) which is coupled to the second manually operable drive wheel (92) and second rope (102), the second reduction gear set (96, 98) configured to convert a rotary motion of the second manually operable drive wheel (92) into circulating drive motion of the second rope (74, 102).

8. The microscope stage (14) according to claim 1, wherein the first linear guide (48) has a first guide rail (86) arranged along the first axis and at least one first linear bearing (88, 90) coupled to the first slider (38), the at least one first linear bearing (88, 90) being displaceable relative to the first guide rail (86); and wherein the second linear guide (62) has a second guide rail (114) arranged along the second axis and at least one second linear bearing (116, 118) coupled to the second slider (46), the at least one second linear bearing (116, 118) being displaceable relative to the second guide rail (114).

9. The microscope stage (14) according to claim 1, wherein the specimen holder (18) is made of a material having a first specific density, the first slider (38) is made of a material having a specific density less than the first specific density, and the second slider (46) is made of a material having a specific density less than the first specific density.

10. The microscope stage (14) according to claim 9, wherein the specimen holder (18) is made of brass, and the first slider (38) and the second slider (46) are made of aluminum.

11. The microscope stage (14) according to claim 1, wherein an objective (24) is mounted to the platform (16).

12. The microscope stage (14) according to claim 11, wherein the objective (24) is mounted to an underside of the platform (16) via a focusing drive (22).

13. The microscope stage (14) according to claim 1, wherein the platform (16) has a through hole (28) that is aligned with an imaging beam path of a microscope.

14. A microscope (10) having a microscope stage (14) according to claim 1.

15. The microscope (10) according to claim 14, further comprising an objective revolver (30) for selective rotation of one of several microscope objectives (32) held by the objective revolver (30) into an imaging beam path of the microscope.

* * * * *